United States Patent
Barak et al.

(10) Patent No.: US 9,384,300 B2
(45) Date of Patent: Jul. 5, 2016

(54) MODELED APPLICATIONS MULTIPLE VIEWS GENERATION MECHANISM

(75) Inventors: Nimrod Barak, Nes Tziona (IL); Doron Lehmann, Kfar Vradim (IL); Eyal Nathan, Tel-Aviv (IL)

(73) Assignee: SAP AG, Walldorf (DE)

( * ) Notice: Subject to any disclaimer, the term of this patent is extended or adjusted under 35 U.S.C. 154(b) by 475 days.

(21) Appl. No.: 13/534,284

(22) Filed: Jun. 27, 2012

(65) Prior Publication Data

US 2014/0006923 A1 Jan. 2, 2014

(51) Int. Cl.
*G06F 17/30* (2006.01)
*G06F 17/24* (2006.01)

(52) U.S. Cl.
CPC ........ *G06F 17/30905* (2013.01); *G06F 17/243* (2013.01)

(58) Field of Classification Search
CPC .......... G06F 17/2247; G06F 17/30905; G06F 17/212; G06F 17/211; G06F 17/24
USPC ......................................... 715/234, 238, 252
See application file for complete search history.

(56) References Cited

U.S. PATENT DOCUMENTS

| | | | |
|---|---|---|---|
| 6,826,750 B1* | 11/2004 | Curtis et al. | 717/170 |
| 7,240,327 B2* | 7/2007 | Singh | G06F 8/30 709/218 |
| 8,549,469 B2* | 10/2013 | Bolarinwa | 717/105 |
| 2010/0077386 A1* | 3/2010 | Akkiraju et al. | 717/136 |

OTHER PUBLICATIONS

Carla Fabrizio, Oracle Role Manager Developer's Guide Release 10g, Nov. 2008, p. 3-1 to 3-6, Preface p. ix and copyright page.*
W3C, May 1, 2012, World Wide Web Consortium, http://www.w3.org/TR/html401/interact/scripts.html#adef-onselect, p. 2.*

* cited by examiner

*Primary Examiner* — Scott Baderman
*Assistant Examiner* — Seung Jung
(74) *Attorney, Agent, or Firm* — Buckley, Maschoff & Talwalkar LLC (57) ABSTRACT

According to some embodiments, a method and apparatus are provided to receive a first application archive, create a generic view model based on the first application archive, and create a second application archive based on the generic view model.

18 Claims, 7 Drawing Sheets

100

```
┌─────────────────────────────────────────────────────────────────┐
│                                                                 │
│              Receive a first application archive                │
│                                                             101 │
└─────────────────────────────────────────────────────────────────┘
                                 │
                                 ▼
┌─────────────────────────────────────────────────────────────────┐
│                                                                 │
│      Create a generic view model based on the application archive│
│                                                             102 │
└─────────────────────────────────────────────────────────────────┘
                                 │
                                 ▼
┌─────────────────────────────────────────────────────────────────┐
│                                                                 │
│  Create a second technology specific application archive based on the generic │
│                           view model                            │
│                                                             103 │
└─────────────────────────────────────────────────────────────────┘
```

| Platform Type 702 | Adapter 704 |
|---|---|
| Android | 1 |
| Iphone | 2 |
| Android Tablet | 1 |

FIG. 7

MODELED APPLICATIONS MULTIPLE VIEWS GENERATION MECHANISM

BACKGROUND

A web portal is a web site that combines information from a variety of different sources in a single web page. Typically, each information source is associated with a dedicated area on a web portal for displaying information and each dedicated area may be associated with a web browser frame. Each frame may be associated with an application.

Many users view existing web pages via a mobile device (e.g., tablet or smartphone). However, viewing and interacting with a web page can be difficult on a mobile device. While a web page may fit a screen sized for a non-mobile device (e.g., a desktop computer or a laptop computer), the same web page may not fit a screen sized for mobile devices. In this situation, a user may need to scroll up/down or right/left on their mobile device to view pertinent information on the mobile device. Not only does this make viewing a web portal difficult, but also time consuming.

DETAILED DESCRIPTION

In some embodiments, a web browser frame may comprise an iView. An iView may be defined as any kind of application, information or service that can be visualized in a Web browser frame. iViews may comprise self-contained web documents that are provided via a Uniform Resource Locator (URL) and are managed by a web portal framework. An iView may lead directly to a website but an iView offers some content to users to fulfill its reason for purpose within its allotted space in the web browser frame. iViews may be linked such that when making a change in a first iView, content in a second iView may be changed based on the change in the first iView. Each iView may be associated with an application.

Figure 1:
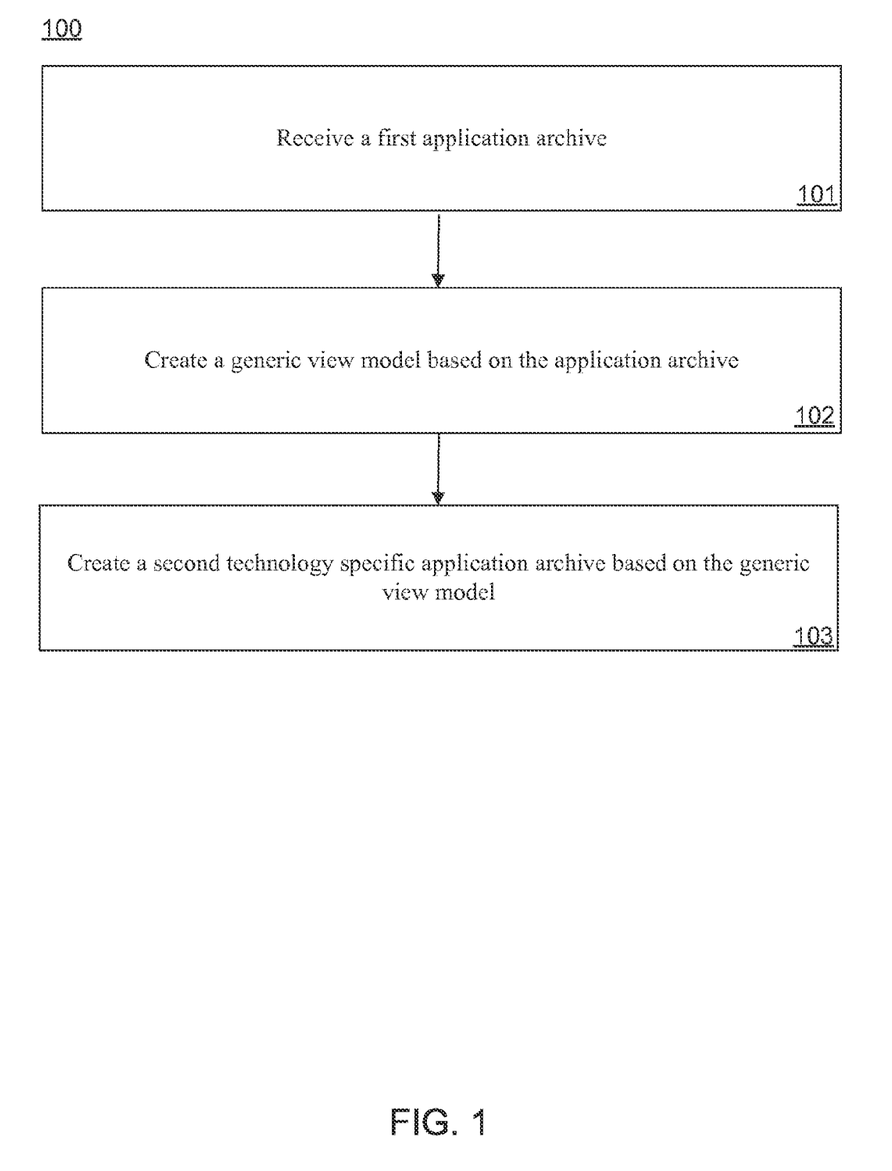
FIG. 1 illustrates a method according to some embodiments.

Referring now to FIG. 1, an embodiment of a method 100 is illustrated. The method 100 may be embodied on a non-transitory computer-readable medium. Furthermore, the method 100 may be performed by an apparatus such as, but not limited to, the apparatus of FIG. 5. The method 100 may relate to creating a plurality of applications based on a received application archive.

At 101, a first application archive is received. An application archive may comprise a deployable unit that includes an application. For example, in a Java domain, a .war or .ear file contains application jars, resources (images, CSS files etc.) and descriptors and these files may comprise an application archive. An application archive may be selected and uploaded. Once uploaded, a technology specific adapter may be automatically determined and then used to open the application archive. The application archive may be analyzed and the a selection of a technology specific adapter may be automatically determined based on the content of the application archive. For example, different technologies use different file names for their resources. Therefore, the determination of a technology specific adapter may be based on the file names of specific resource files.

Figure 2:
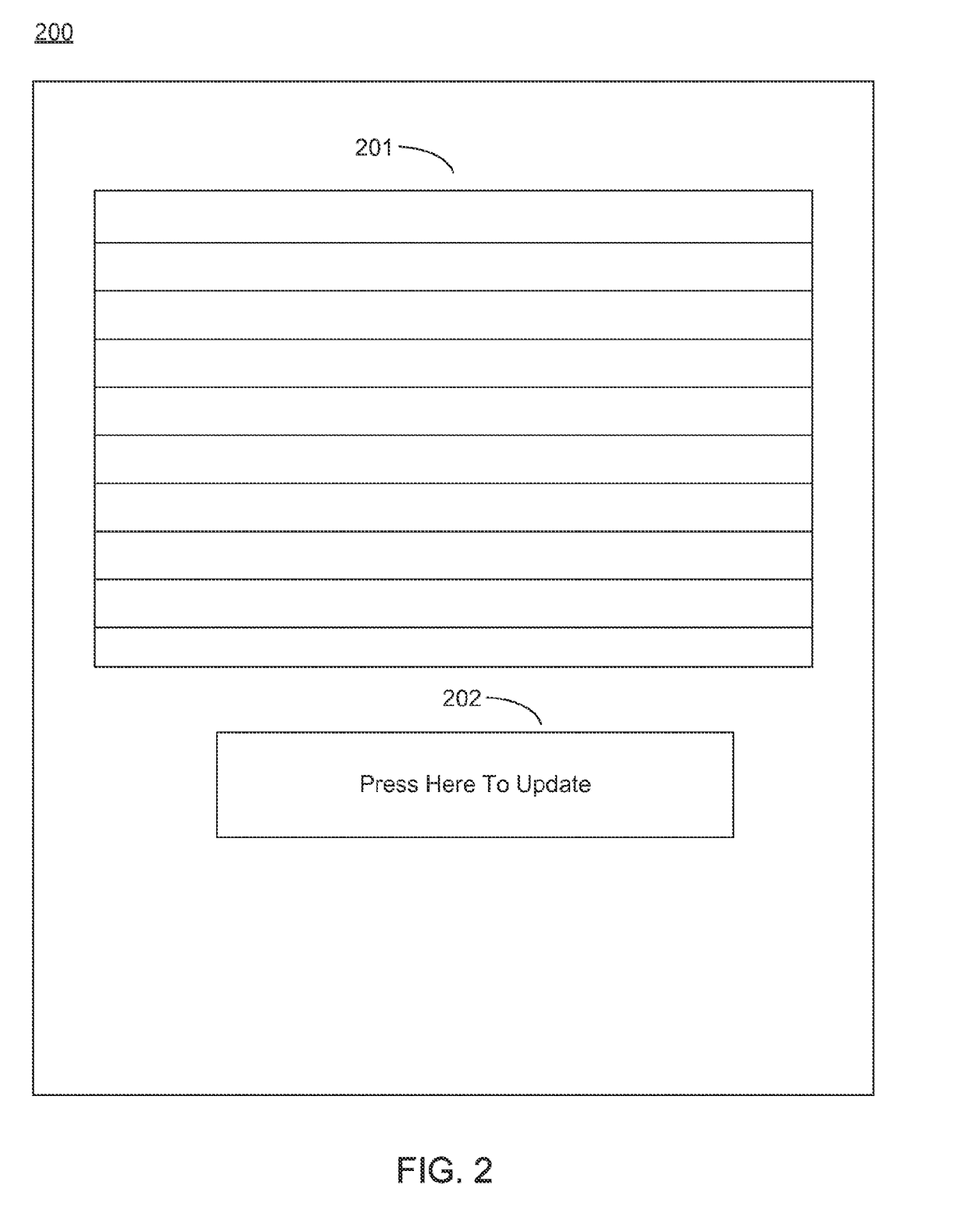
FIG. 2 illustrates a web page viewed on a device according to some embodiments.

For illustrative purposes, and to aid in understanding features of the specification, some examples will now be introduced. These examples are not intended to limit the scope of the claims. In a first example, and now referring to FIG. 2, an application archive is received at a system. The application archive may be associated with a web portal 200 that comprises a list application 201 and an update button 202. In some embodiments, FIG. 2 may illustrate a web portal 200 as viewed on a tablet. As illustrated, the list application 201 may present a plurality of list elements (e.g., ten list elements are illustrated). Furthermore, the update button 202 may comprise update text which in this embodiment states "Press Here to Update". The web portal may be associated with business logic that provides the logic for the update button 202 to refresh the list application 201 with a next set of list elements at a rate of ten at a time when the update button 202 is activated.

At 102, a generic view model based on the application archive is created. A view model may comprise an XML file, HTML file, or other type of file that represents view elements (e.g., elements viewed on a display) that may be associated with the application archive.

The uploaded application archive may be passed to a selected technology specific adapter which may extract the necessary files from it (e.g., model files, business logic JARs etc.). The application archive may also comprise a view model and the technology specific adapter may also translate the application archive's view model to a generic model.

The view model (and thus the application archive) may comprise a user interface level and a business logic level. The business logic level for the application archive's view model and the generic model may remain the same while the user interface level may be different. The business logic level comprises the logic associated with the web page (e.g., actions, conditional logic, external interface information, etc.).

In one embodiment, a connection to the business logic may be through the 'data_source', 'on_select' and 'action' properties of elements displayed as part of the view model. These aspects may represent methods in the application's business logic that will be triggered, for example, for filling a list with items when a list item is selected or deleting an item when a 'delete' button is clicked. This general view model may be rendered using different technologies, such as, but not limited to, HTML, FLEX, SilverLight etc.

In some embodiments, the user interface level may interface with a specific technology so that the business logic level can be used with multiple platforms (e.g., Apple based smartphone, Android based smartphone, Android based Tablet, etc.) by making changes to the interface level. Therefore, each specific user interface level may be tailored to a specific technology while the business logic remains the same.

Typically, each technology or framework comprises its own syntax for the view model, its own rendering engine (for example, SAP Web Dynpro to render HTML), and its own runtime engine (the connection between the rendered application and the business logic).

Given an application designed for a specific technology/platform, the generic view model may comprise a generic user interface level design that interfaces with a business logic level for the particular application. However, the generic view model may comprise non-platform specific information associated with the user interface. For example, the generic view model may identify aspects of the application to be adapted by a variety of technologies but the generic view model may not define the user interface based on any particular technology. Therefore, the generic view model may be generic to many different technologies.

Figure 3:
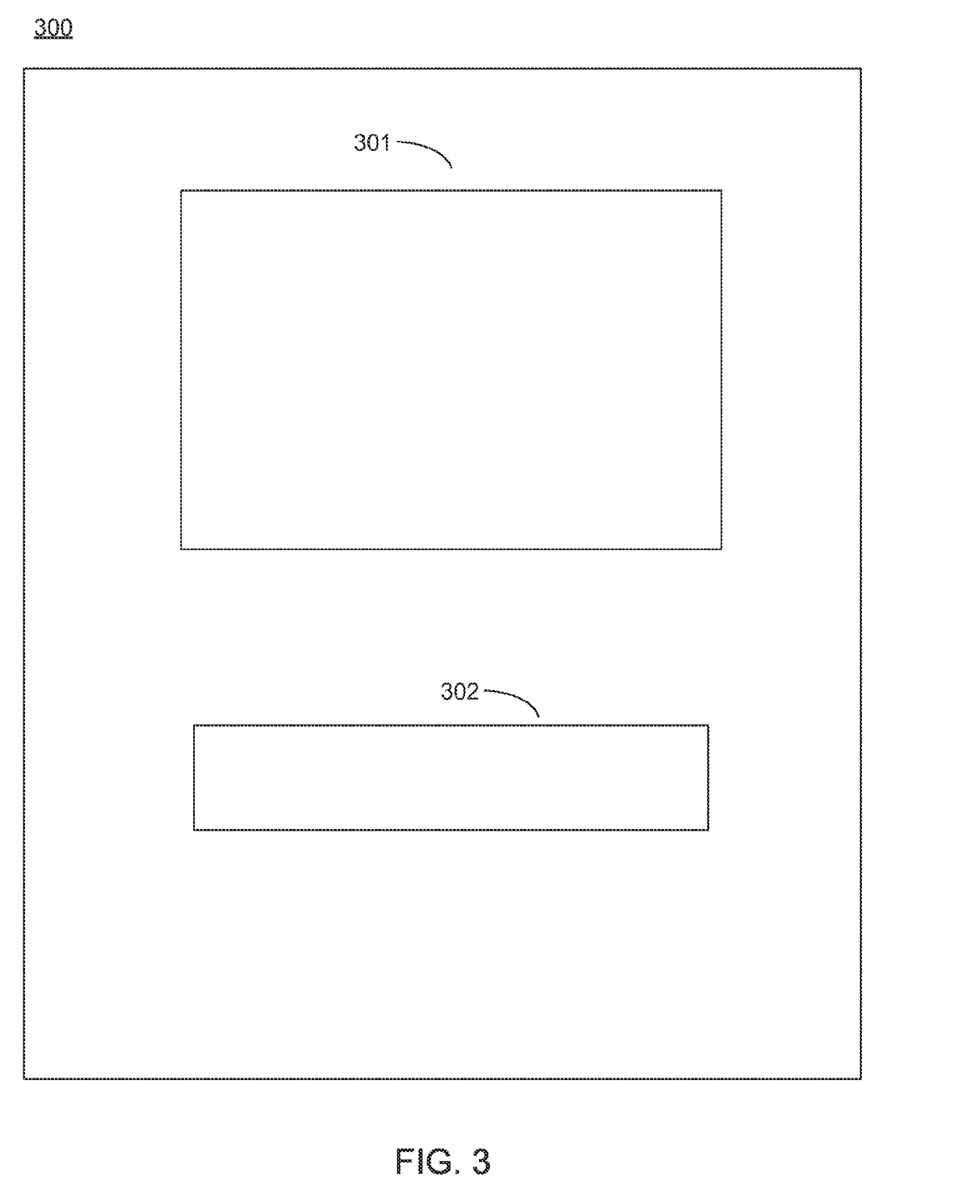
FIG. 3 illustrates a generic view model according to some embodiments.

Continuing with the above example and now referring to FIG. 3, in some embodiments, FIG. 3 illustrates a generic view model 300 based on the application archive associated with the web portal 200. As illustrated, the generic view model 300 is embodied as a graphic generic view model. In some embodiments, however, the generic view model may be text based such as, but not limited to, an HTML or XML based file. In the present embodiment, the generic view model 300 comprises a generic list application 301 and a generic button 302. The generic view model may describe elements of the web portal that interact with a user in a generic format that may be later adapted to a specific platform (e.g., a specific technology). For example, the generic button 302 may model an update button as described in FIG. 2. However, different buttons (e.g., size, color, shape, and/or descriptive text) may be used for different platforms. Likewise, any software widget may be identified in a general descriptive format. Sizes and other details associated with the generic view model elements may be incorporated into user interface level associated with a specific platform and/or technology.

Next, at 103, a second application archive based on the generic view model is created. The second application archive may be created by using a processor.

According to some embodiments, once a generic model is created, an editor (such as the editor described with respect to FIG. 6) may visualize (e.g., display) the view model according to the generic view. In some embodiments, visualization in the editor may look different than how the view model will look during runtime since the generic model may not be the same as the original view model, and different rendering technology may be used.

The editor may allow a user to change the properties and order of the different view elements—for example, a user may hide a button by changing the value of its 'visibility' property to 'none', or make details of a text box smaller by changing the 'height' property to '40px'.

When done, the user may activate a "Save" button that triggers the technology specific adapter to translate the generic model back into a technology specific view model, and create a new application archive (WAR/EAR) using the original business logic (JAR files) and the new view model. The new archive contains the modified application, and it may be deployed and used on a system associated with web pages and/or web portals.

Figure 4:
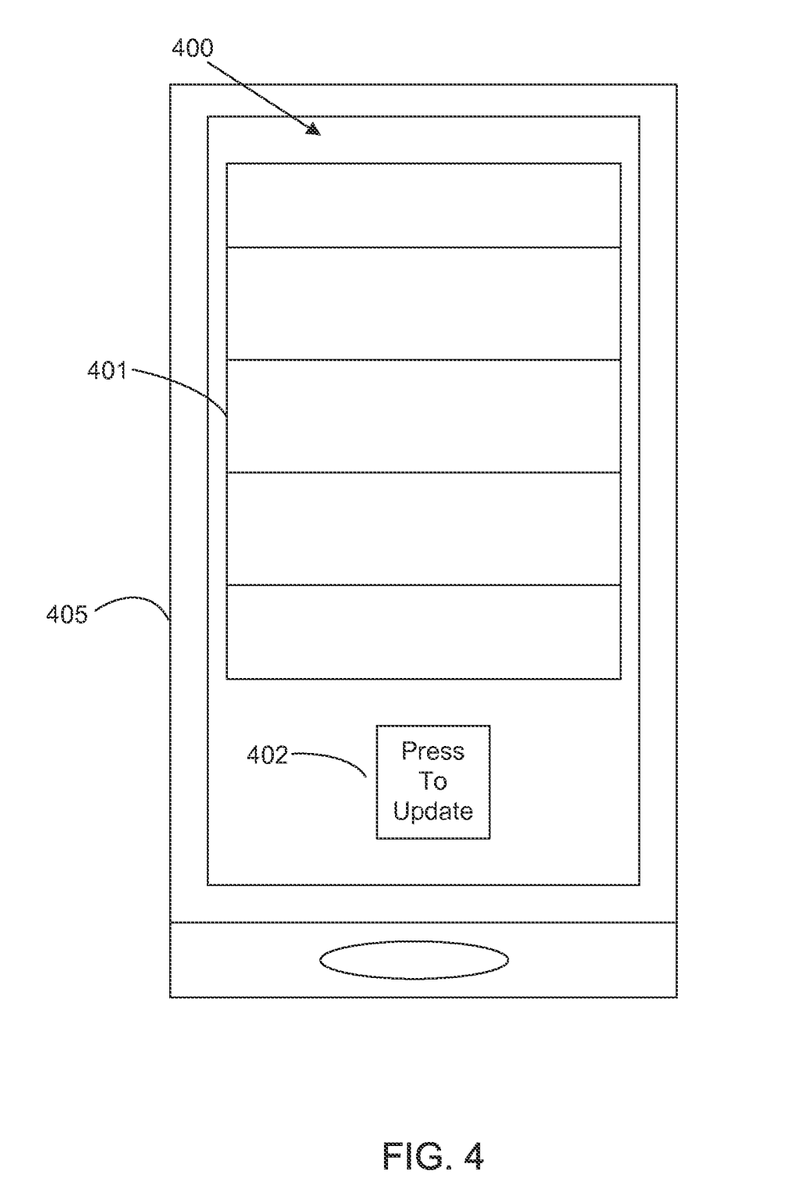
FIG. 4 illustrates a web page viewed on a device according to some embodiments.

Continuing with the above example and now referring to FIG. 4, the web portal 400 may be edited and saved as a separate application. In the present embodiment, the web portal may be saved in a same technology format or a different technology format, for example, to be viewed on a smartphone 405 (e.g., Apple based smartphone).

The web portal 400 may be associated with a second application archive based on the generic view model 300. For example, based on the generic view model 300 a version of the web portal 400 for an Apple based smartphone 405 may be created. As illustrated, the list application 401 may comprise a plurality of list elements (e.g., room for five list elements are illustrated). Furthermore, the update button 402 may comprise update text which in this embodiment states "Press to Update". As illustrated, the text of update button 202 is different from update button 402. Moreover, a size of update button 202 is larger than the update button 402 which may correspond to a platform display size associated with different variants. The update button 402 may refresh the list application 401 with a next set of list elements at a rate of five at a time. In the present embodiments, both the web portals of FIG. 2 and FIG. 4 utilize the same business logic but the user interfaces are different for each platform.

Figure 5:
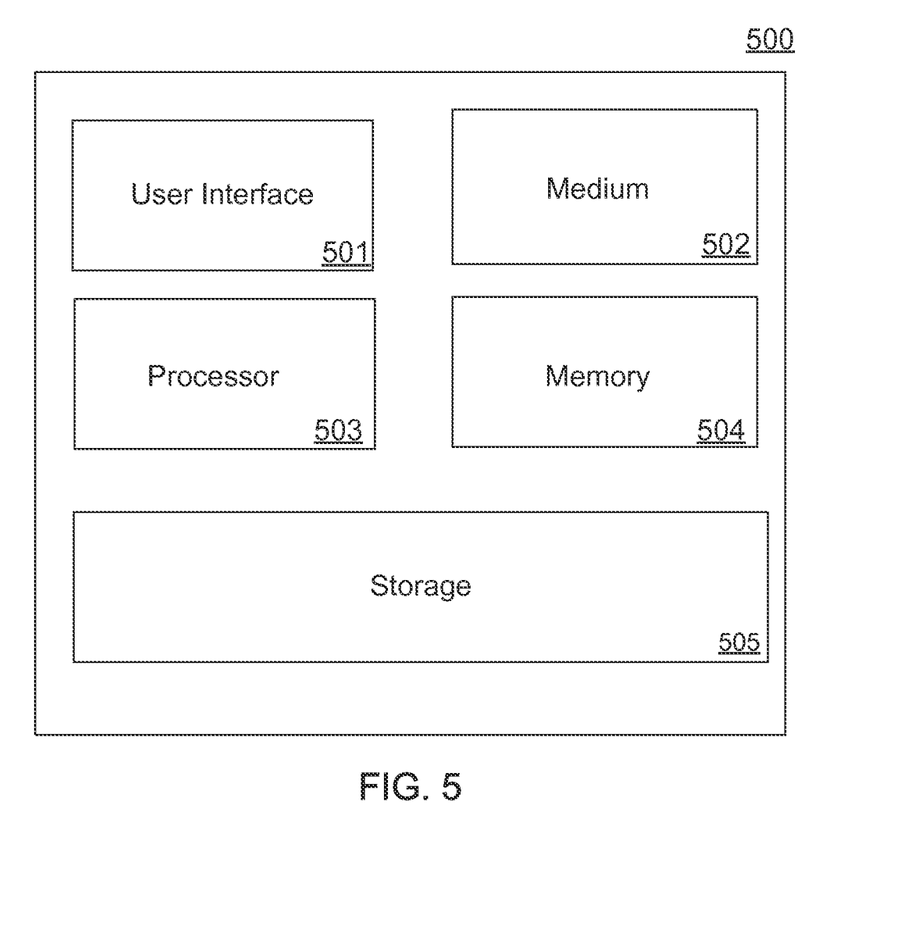
FIG. 5 illustrates a computing system according to some embodiments.

Now referring to FIG. 5, an embodiment of an apparatus 500 is illustrated. The apparatus 500 may comprise a user interface 501, a main memory 502, a processor 503, a medium 504, and a storage device 505. According to some embodiments, the apparatus 500 may further comprise a digital display port, such as a port adapted to be coupled to a digital computer monitor, television, portable display screen, or the like.

The user interface 501 may allow users to interact with the apparatus 500 using text commands or with images/graphical icons. In some embodiments, the user interface may comprise a keyboard, mouse, or associated port related thereto. Furthermore, the user interface 501 may comprise a display or a touch screen.

The main memory 502 may comprise any type of memory for storing data, such as, but not limited to, a Secure Digital (SD) card, a micro SD card, a Single Data Rate Random Access Memory (SDR-RAM), a Double Data Rate Random Access Memory (DDR-RAM), or a Programmable Read Only Memory (PROM). The main memory 502 may comprise a plurality of memory modules.

The processor 503 may include or otherwise be associated with dedicated registers, stacks, queues, etc. that are used to execute program code and/or one or more of these elements may be shared there between. In some embodiments, the processor 503 may comprise an integrated circuit. In some embodiments, the processor 503 may comprise circuitry to perform a method such as, but not limited to, the method described with respect to FIG. 1.

The processor 503 communicates with the storage device 505. The storage device 650 may comprise any appropriate information storage device, including combinations of magnetic storage devices (e.g., a hard disk drive), optical storage devices, and/or semiconductor memory devices. The storage device 505 stores a program for controlling the processor 503. The processor 503 performs instructions of the program, and thereby operates in accordance with any of the embodiments described herein. For example, the processor 503 may create an application archive based on the generic view model.

The medium 504 may comprise any computer-readable medium that may store processor-executable instructions to be executed by the processor 503. For example, the medium 504 may comprise a non-transitory tangible medium such as, but is not limited to, a compact disk, a digital video disk, flash memory, optical storage, random access memory, read only memory, or magnetic media.

The program may be stored in a compressed, uncompiled and/or encrypted format. The program may furthermore include other program elements, such as an operating system, a database management system, and/or device drivers used by the processor 503 to interface with peripheral devices.

As used herein, information may be "received" by or "transmitted" to, for example: (i) the apparatus 500 from another device; or (ii) a software application or module within the apparatus 500 from another software application, module, or any other source.

In some embodiments, the storage device 505 stores a database (e.g., including information associated with an application and its associated rules). An example of a database that may be used in connection with the apparatus 500 is described in detail with respect to FIG. 7. Note that the database described herein is only an example, and additional and/or different information may be stored therein. Moreover, various databases might be split or combined in accordance with any of the embodiments described herein.

Figure 6:
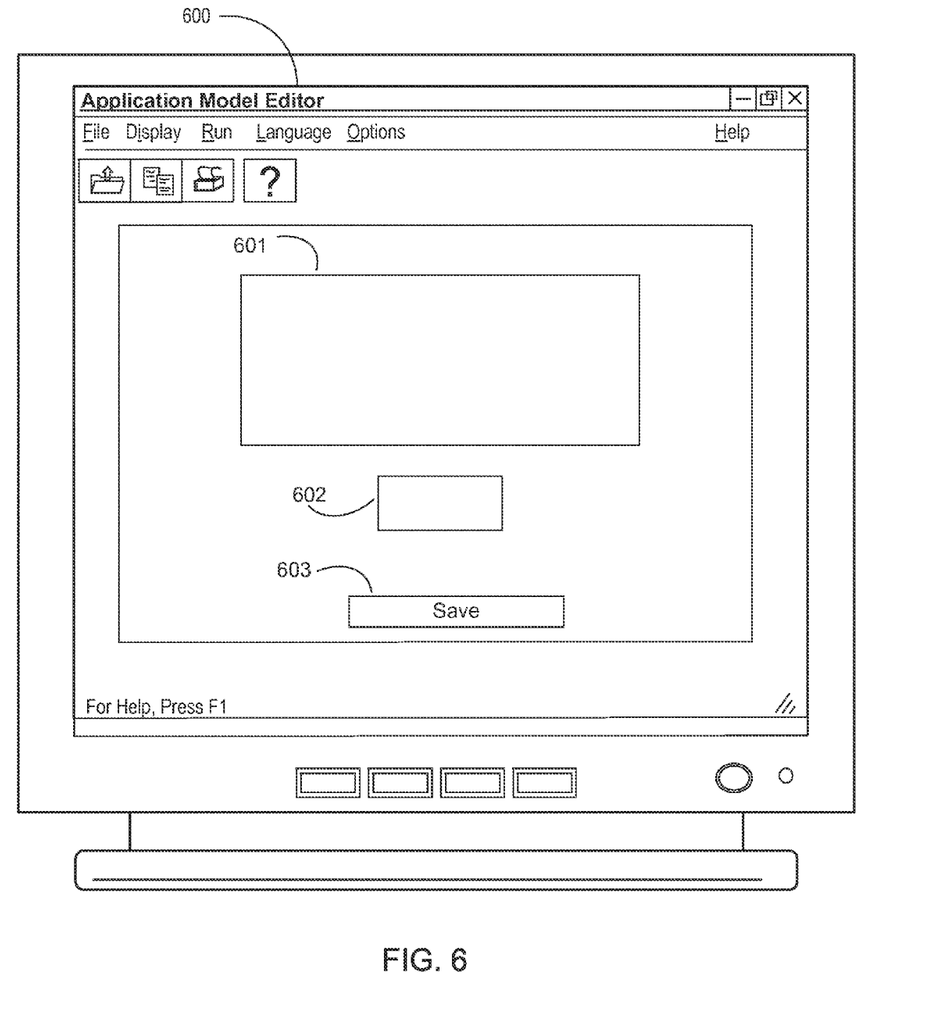
FIG. 6 illustrates an editor according to some embodiments.

FIG. 6 illustrates an editor 600 according to some embodiments. The editor 600 may facilitate the creation of an application archive based on a generic view model. For example, a user may select an application archive to modify. Once selected, a technology specific adapter may be determined and via the technology specific adapter, view items will be displayed. As illustrated, view elements such as a list application 601 and a button 602 are illustrated. A user may then modify the view elements and press a save button 603 to save the generic view model as an application archive. The generated application archive may be created based on a generic view model as well as data associated with the selected platform.

Figure 7:
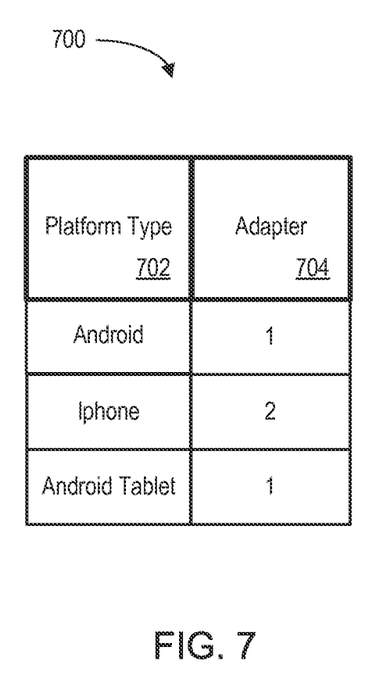
FIG. 7 illustrates a portion of a database that might be stored in accordance with some embodiments.

Referring to FIG. 7, a table is shown that represents the database 700 that may be stored at a web server, such as apparatus 500. The table may define fields 702 and 704 for each of the entries. The fields 702 and 704 may, according to some embodiments, specify: a platform type 702 and a technology specific adapter 704. The information in the database 700 may be created and updated.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, may be stored on a tangible, machine readable medium and supplied to various customers or manufacturing facilities to load into the fabrication machines that actually make the logic or processor.

Various modifications and changes may be made to the foregoing embodiments without departing from the broader spirit and scope set forth in the appended claims. The following illustrates various additional embodiments and do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

What is claimed is:

1. A method comprising:
receiving a first application archive associated with an application and comprising a plurality of files, wherein the first application archive includes a technology specific view model that comprises (i) a business logic level that comprises logic associated with a web portal and (ii) a first user interface level to interface with a first platform type;
automatically determining, from a plurality of technology specific adapters, one of the plurality of technology specific adapters based on (i) a file name of one or more resource files associated with a corresponding technology and (ii) a database storing information associated with platform types and their corresponding technology specific adapters;
creating a generic view model based on translating the technology specific view model via the one of the plurality of technology specific adapters, wherein the generic view model (i) comprises a generic user interface level design that interfaces with the business logic level associated with the application and (ii) describes elements of the web portal that interact with a user in a non-platform specific format; and
creating, via a processor, a second application archive based on the generic view model and a second of the plurality of technology specific adapters, wherein the second application archive includes (i) the business logic level that comprises the logic associated with the web portal and (ii) a second user interface level to interface with a second platform type associated with a mobile platform, wherein the first platform type is different than the second platform type.

2. The method of claim 1, wherein the second user interface level differs from the first user interface level.

3. The method of claim 1, wherein a connection to the business logic level is associated with an onselect property of elements of the view model.

4. The method of claim 1, wherein the first specific technology is related to a first operating system and the second specific technology is related to a second operating system wherein the first operating system and the second operating system are different.

5. The method of claim 1, wherein the application archive comprises a deployable unit that includes an application.

6. The method of claim 1, wherein the application archive comprises a resource file and automatically determining a technology specific adapter associated with the received first application archive is based on a name of the resource file.

7. A non-transitory computer-readable medium comprising instructions that when executed by a processor perform a method, the method comprising:
receiving a first application archive associated with an application and comprising a plurality of files, wherein the first application archive includes a technology specific view model that comprises (i) a business logic level that comprises logic associated with a web page and (ii) a first user interface level to interface with a first platform type;
automatically determining, from a plurality of technology specific adapters, one of the plurality of technology specific adapters based on (i) a file name of one or more resource files associated with a corresponding technology and (ii) a database storing information associated with platform types and their corresponding technology specific adapters;

creating a generic view model based on translating the technology specific view model via the one of the plurality of technology specific adapters, wherein the generic view model (i) comprises a generic user interface level design that interfaces with the business logic level associated with the application and (ii) describes elements of the web portal that interact with a user in a non-platform specific format; and creating, via the processor, a second application archive based on the generic view model and a second of the plurality of technology specific adapters, wherein the second application archive includes (i) the business logic level that comprises the logic associated with the web portal and (ii) a second user interface level to interface with a second platform type associated with a mobile platform, wherein the first platform type is different than the second platform type.

8. The medium of claim 7, wherein the second user interface level differs from the first user interface level.

9. The medium of claim 7, wherein a connection to the business logic level is associated with an onselect property of elements of the view model.

10. The medium of claim 7, wherein the first specific technology is related to a first operating system and the second specific technology is related to a second operating system wherein the first operating system and the second operating system are different.

11. The medium of claim 7, wherein the application archive comprises a deployable unit that includes an application.

12. The medium of claim 7, wherein the application archive comprises a resource file and automatically determining a technology specific adapter associated with the received first application archive is based on a name of the resource file.

13. An apparatus comprising:
a processor;
a non-transitory computer-readable medium comprising instructions that when executed by the processor perform a method, the method comprising:
receiving a first application archive associated with an application and comprising a plurality of files, wherein the first application archive includes a technology specific view model that comprises (i) a business logic level that comprises logic associated with a web page and (ii) a first user interface level to interface with a first platform type;

automatically determining, from a plurality of technology specific adapters, one of the plurality of technology specific adapters based on (i) a file name of one or more resource files associated with a corresponding technology and (ii) a database storing information associated with platform types and their corresponding technology specific adapters;

creating a generic view model based on translating the technology specific view model via the one of the plurality of technology specific adapters, wherein the generic view model (i) comprises a generic user interface level design that interfaces with the business logic level associated with the application and (ii) describes elements of the web portal that interact with a user in a non-platform specific format; and creating, via the processor, a second application archive based on the generic view model and a second of the plurality of technology specific adapters, wherein the second application archive includes (i) the business logic level that comprises the logic associated with the web portal and (ii) a second user interface level to interface with a second platform type associated with a mobile platform, wherein the first platform type is different than the second platform type.

14. The apparatus of claim 13, wherein the second user interface level differs from the first user interface level.

15. The apparatus of claim 13, wherein a connection to the business logic level is associated with an onselect property of elements of the view model.

16. The apparatus of claim 13, wherein the first specific technology is related to a first operating system and the second specific technology is related to a second operating system wherein the first operating system and the second operating system are different.

17. The apparatus of claim 13, wherein the application archive comprises a deployable unit that includes an application.

18. The apparatus of claim 13, wherein the application archive comprises a resource file and automatically determining a technology specific adapter associated with the received first application archive is based on a name of the resource file.

* * * * *